United States Patent

[11] 3,589,757

| [72] | Inventor | Paul C. Mooney |
| | | Northbrook, Ill. |
| [21] | Appl. No. | 829,932 |
| [22] | Filed | June 3, 1969 |
| [45] | Patented | June 29, 1971 |
| [73] | Assignee | Quick-Set, Incorporated |

[54] AUTOMATIC LOCK FOR EXTENSIBLE CAMERA TRIPOD LEG
5 Claims, 4 Drawing Figs.

[52] U.S. Cl................................................ 287/58,
248/354, 248/188.5
[51] Int. Cl.................................................. F16b 7/10
[50] Field of Search........................................... 287/58 CT,
58; 248/354 C, 188.5, 412, 408, 411, 414; 24/254

[56] References Cited
UNITED STATES PATENTS

| 1,324,781 | 12/1919 | Akeley | 248/188.5 |
| 1,736,290 | 11/1929 | Schiff | 24/254 |
| 1,768,427 | 6/1930 | Stevens | 248/411 |
| 2,262,939 | 11/1941 | Howard | 248/188.5 |
| 3,453,011 | 7/1969 | Meinunger | 287/58 CT |

FOREIGN PATENTS

| 861,930 | 1/1953 | Germany | 248/188.5 |
| 519,460 | 3/1955 | Italy | 248/354 C |

*Primary Examiner*—David J. Williamowsky
*Assistant Examiner*—Andrew V. Kundrat
*Attorney*—Hofgren, Wegner, Allen, Stellman and McCord ABSTRACT: A locking arrangement for an extensible telescoping tripod leg assembly which automatically locks against retraction thereof; characterized by the provision of a spring pressed constant rise cam member carried by one of the leg parts and normally held in contact with the other of the leg parts, relative movement of the leg parts to an extended position causing movement of the cam to a release position and attempted relative movement of the legs to a retracted position causing movement of the cam to a locking position where the cam urges portions of the legs together in locking engagement.

PATENTED JUN29 1971 3,589,757

INVENTOR.
PAUL C. MOONEY
BY Hofgren, Wegner, Allen,
Stillman & McCord
ATTORNEYS.

AUTOMATIC LOCK FOR EXTENSIBLE CAMERA TRIPOD LEG

BACKGROUND OF THE INVENTION

1. Field of the Invention

This invention relates to tripod devices, and more particularly, to a novel automatic locking arrangement for tripod legs.

2. Brief Description of the Prior Art

In the art relating to tripod supports, such as those utilized for supporting cameras and the like, it is common for the leg structures to be extensible to adapt the tripod for different elevations of intended use. It is most desirable that the leg structure have a locking means associated therewith which is capable of locking the structure in any extended or retracted position and is further capable of being very easily manipulated to lock and unlock the leg structure as desired.

A common arrangement for such locking structures has been to provide a sleeve or the like around one or two of the extensible leg components with a setscrew positioned in the sleeve and bearing either directly or indirectly against one of the leg elements. Reverse threading of the setscrew unlocks the two relatively movable leg components and the opposite threading movement brings a frictional locking force to bear against the leg components and hold them in a predetermined position. Another arrangement which has been used in tripod-type structures for locking the extensible legs thereof is a toggle movable from an over center position to an under center position. In each case, manipulation on the part of the user is required to both activate the locking arrangement as well as deactivate the locking arrangement. There is a continued need to provide an improved locking arrangement for extensible legs of tripodlike structures which requires a minimum of manipulation by a user and it is to this end that the present invention is directed.

SUMMARY OF THE INVENTION

This invention is directed, in brief, to the provision of an improved locking arrangement for the extensible legs of a tripod-type support.

The best mode currently contemplated by me for carrying out the invention includes the provision of generally concentric, telescopically assembled, leg members with the outermost leg member bearing a pivoted constant rise cam member having a locking surface thereon, with spring means normally biasing the cam member to a locking position. The cam member is normally kept in line contact with the underlying surface of the inner leg member. Relative slidable movement of the leg assembly in one direction tends to lift the cam from line contact with the underlying surface of the inner leg member, whereas reverse movement of the two leg members moves the cam locking surface against the underlying surface of the inner leg member to force opposing portions of the leg members together and lock the legs in an extended position.

Figure 1:
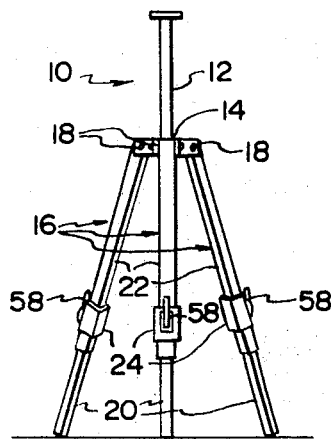
FIG. 1 is an elevational view of a tripod structure utilizing the locking means of this invention.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

Referring now to the drawings, in FIG. 1 there is shown a tripod structure 10 including an extensible standard 12 and an intermediate collar 14. A plurality of leg assemblies 16, usually three in number, are pivoted at 18 to the collar 14. Each of the leg assemblies 16 includes two generally concentric, telescopically related leg members, such as inner and outer leg members 20 and 22, respectively. The leg members are made of a suitable durable material, such as metal or the like. The locking arrangement 24 of this invention is provided for automatically securing the legs in an extended position against unintended reverse movement thereof, but permitting free extending movement of the legs relative to each other.

Figure 3:
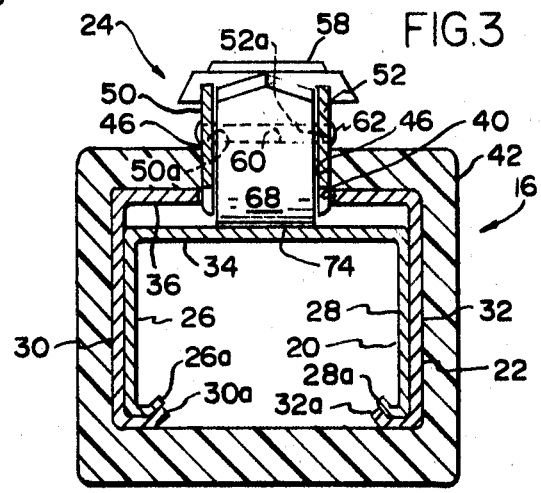
FIG. 3 is a section view taken generally along the lines 3-3 of FIG. 2.

Each of inner and outer legs 20 and 22 is substantially channel or U-shaped in section. The leg members 20 and 22 include spaced sidewalls or legs 26, 28 and 30, 32, respectively, which are spanned by central portions 34 and 36, respectively. Each of the sidewalls or legs 26, 28; 30, 32, respectively, terminate in upwardly inturned end portions 26a, 28a; 30a, 32a, respectively. Generally speaking, and as best seen in FIG. 3, it is intended that the leg members 20 and 22 would be nestably received one within the other in close sliding contact, at least between the leg and end portions thereof. End portions 26a, 28a, 30a and 32a provide portions which face in opposition to each other and which are generally opposite portions 34 and 36. If desired, a knurled surface 38 or the like may be provided on the exterior of central portion 34 of leg member 20. Preferably portions 26a and 30a and portions 28a and 32a are in close sliding engagement with each other so that only slight movement of portions 26a and 28a toward portions 30a and 32a is necessary to frictionally lock leg members 20 and 22 against movement relative to each other.

Portion 36 of leg member 22 is provided with an opening 40. In the area of the opening 40 a sleeve structure 42 surrounds the leg member 22. Sleeve 42 is also provided with an opening 44 which is generally in registration with the opening 40. A support member 46 having a central opening 48 is positioned within the openings 40 and 42. Support member 46 includes spaced generally parallel upstanding ears 50 and 52 which have aligned openings 50a and 52a, respectively, therein. Support member 46 also has forward and rearward extensions 54 and 56, respectively, which abut the underside of portion 36 of leg member 32 on either end of opening 40 to prevent movement of the supporting member 46 outwardly from the openings 40 and 42.

Figure 4:
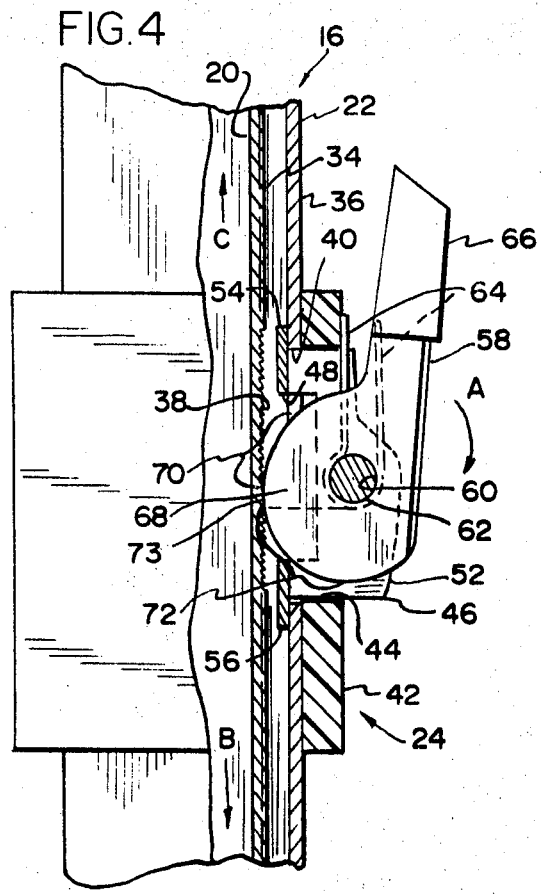
FIG. 4 is a fragmentary view in partial section taken generally along the line 4-4 of FIG. 2.

The locking arrangement includes a constant rise cam or lock member 58 having a through opening 60 extending across the width thereof. A pivot pin 62 is positioned in openings 50a and 52a in the ears 50 and 52 and also in through opening 60 in the lock member 58 to pivotally mount the lock member with respect to the assembly. Spring or biasing means 64 is interposed between the underside of the cam the the top of the sleeve, to urge the cam member in the direction indicated by the arrow A in FIG. 4. In the embodiment shown, the spring is a generally U-shaped wire spring wrapped about the pin 62, but it is to be understood that any other suitable biasing arrangement could be used.

The cam or lock member 58 includes a lever portion 66 and a hub portion 68. Lever portion 66 is generally flat and elongate affording a surface which may be easily depressed by the thumb or forefinger to rotate the member 58 about its pivotal mounting 60, 62. Hub portion 58 is substantially, though not exactly, partially circular cylindrical in side elevation and includes a release portion 70, a locking portion 72, and a contact portion 73 therebetween.

Cam member 58 is a constant rise cam with pivotal mounting 60, 62 of the hub portion 58 slightly off center. Thus, the release portion 70 is of a lesser radius relative to the axis of the pivotal mounting 60—62 than the locking portion 72 which is of a larger radius. Therefore, when the cam member is rotated in a clockwise direction as indicated by the arrow A in FIG. 4, the locking portion 72 of increased radius is brought to bear against the portion 34 of leg member 20. On the other hand, rotation of cam member 58 in a counterclockwise direction will bring the release portion of reduced radius of the cam adjacent portion 34 of leg member 20. It is intended that the sidewalls 26 and 28 of leg member 20 would be of such a dimension that when locking portion 72 of the cam member bears against portion 34 of the leg member, the end portions 26a and 28a of leg 20 would be tightly forced against the end portions 30a and 32a, respectively, of leg member 22; but when release portion 70 is presented adjacent portion 34 of leg member 20, the legs 20 and 22, including the portions 26a, 28a and 30a, 32a would be free to slide relative to each other.

Figure 2:
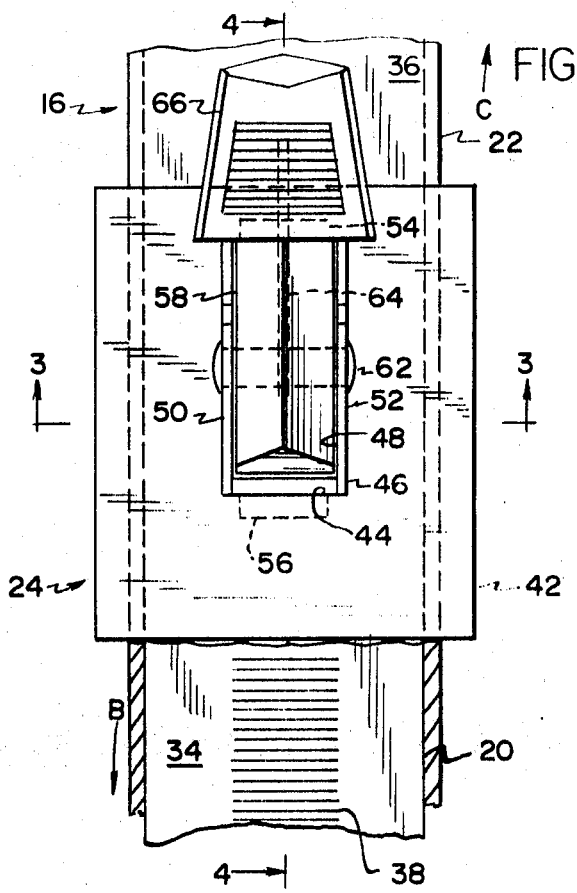
FIG. 2 is a fragmentary enlarged view of a portion of the leg assembly of the tripod shown in FIG. 1 illustrating the locking arrangement in greater detail.

Preferably, the mounting of the cam member 58 in the support 46 is such as to normally place the cam member so that the contact portion 73 is in line contact with the portion 34 of leg member 20, as shown at 74 in FIG. 3. The spring 64 will tend to urge the cam in a clockwise direction so that it is constantly urged towards portion 72. By this arrangement, to and fro sliding movement will affect the locking and unlocking action of the member 58. If the innner leg member 20 is moved in the direction of Arrow B in FIGS. 2 and 4, this will have the effect of slightly reversely rotating the cam member 58 in the direction of portion 70, against the influence of spring 64, and thus sliding extension of the inner leg member 20 relative to outer leg member 22 will be permitted. Conversely, if the inner leg member 20 is urged in a reverse direction, as indicated by the Arrows C in FIGS. 2 and 4, this, together with the action of spring 64 will have the effect of rotating the cam member 58 in the direction indicated by the Arrow A, or towards portion 72. This will increase the impinging effect of the lock 58 on the surface 34 which, in turn, will cause the leg extensions 26a and 28a of leg member 20 to bear against the inturned ends 30a and 32a of leg member 22 and prevent relative movement of leg members 20 and 22. To permit the reverse movement, one need only depress the cam member 58 by applying thumb or finger pressure to the lever portion 66 and thereby swing the hub portion 68 so that the portion 70 is presented adjacent surface 34 of the inner leg member 20.

Depending on manufacturing variations, the precise location of contact portion 73 may vary. However, cam member 58 is normally in an interference relationship with portion 34 of the underlying leg and places the legs in an incipient locking relationship. Subsequent displacement of leg 20 such as by any relative reverse movement thereof will cause tight frictional locking engagement between leg portions 26a and 30a and 28a and 32a. Preferably only about 0.010 inch of vertical displacement is necessary for such locking engagement and this is accomplished immediately upon attempted reverse telescoping of legs 20 and 22 which causes cam member 58 to rotate in the direction of arrow "A" and bring portion 72 into engagement with surface 34.

It is to be understood that other support arrangements for the cam member 58 could be provided in addition to those illustrated herein. For example, the sleeve 42 could be provided with upstanding ears to pivotally support the cam member 58. Another manner of creating the support could be to form upstanding ears such as 50 and 52 as portions directly struck upwardly from the portion 36 of outer leg member 22.

This invention provides an extremely convenient locking arrangement for a leg assembly of an adjustable tripod unit. The telescopically related leg members may be easily extended relative to each other by simple hand pulling. When so extended, they are locked against reverse movement, but not against further extension. Thus, if the leg member is placed on a surface in a supporting function, the opposing forces of the weight supported by the leg member against the supporting surface will cause the lock member 58 to be urged to a tight locking position forcing opposing portions 26a—30a and 28a—32a together in facial juxtaposition with almost no noticeable reverse movement occurring between the two leg members 20 and 22. However, when it is desired to retract the leg members relative to each other, then simple finger pressure applied to the lever portion of the lock member to rotate it in opposition to the biasing efforts of spring 64 will present the reduced portion of the cam member in juxtaposition to portion 34 of leg member 20 to thereby permit the relative reverse sliding of the two leg members.

While the drawings herein show the invention in use with generally rectangular telescopic leg members, it has been found to work equally well with other forms of telescopic leg members including round tubing.

The foregoing detailed description has been given for clearness of understanding only and no unnecessary limitations should be understood therefrom, as some modifications may be obvious to those skilled in the art.

I claim:

1. A locking arrangement for a tripod leg comprising: inner and outer telescopically related leg members with the inner member being nestably received with the outer member, said leg members including leg portions facing in opposition to each other; and opposed edge portions in the outer leg member defining an opening therein; support means in said opening including upright portions extending outwardly of the opening and further including retaining portions extending generally transversely relative to said upright portions and underlying said outer leg member adjacent said opposed edges and a lock member movably mounted between said upright portions, the lock member having a lock head including a lock portion and a release portion and being normally in engagement with the inner leg member; biasing means operatively interposed between the lock member and the outer leg member for normally urging the lock portion of the lock head against the adjacent surface of the telescopically related leg member in opposition to the leg portions of the leg members; relative telescopic movement of the leg members in one direction causing the release portion of the lock head to be presented in the area of normal engagement between the lock member and the adjacent leg member and telescopic movement of the leg members in a reverse direction causing the lock portion of the lock member to bear against the adjacent surface of the adjacent leg member and prevent such reverse movement between the leg members.

2. The locking arrangement of claim 1 further including a sleeve member having an opening therein in alignment with the opening in the outer leg member and wherein said biasing means is interposed between the sleeve member and the lock member with the upright portions of the support means also extending outwardly of the sleeve member opening.

3. The locking arrangement of claim 1 wherein said support means includes a pair of spaced-apart members with said lock member pivoted between said support means and substantially occupying the space therebetween.

4. The locking arrangement of claim 2 wherein the locking member has a generally round lock head and is pivoted off center pivotal mounting providing portions of different radius on the locking head relative to the pivotal axis thereof.

5. The locking arrangement of claim 4 wherein the lock member has a trailing lever portion extending rearwardly from the lock head with the biasing means being interposed between said lever portion and said sleeve.